(12) United States Patent
Vanden Haute

(10) Patent No.: US 11,168,665 B2
(45) Date of Patent: Nov. 9, 2021

(54) WIND TURBINE WORKING PLATFORM

(71) Applicant: PARKWIND NV, Leuven (BE)

(72) Inventor: Cedric Vanden Haute, Ostend (BE)

(73) Assignee: PARKWIND NV, Leuven (BE)

( * ) Notice: Subject to any disclaimer, the term of this patent is extended or adjusted under 35 U.S.C. 154(b) by 0 days.

(21) Appl. No.: 16/763,418

(22) PCT Filed: Nov. 6, 2018

(86) PCT No.: PCT/EP2018/080256
§ 371 (c)(1),
(2) Date: May 12, 2020

(87) PCT Pub. No.: WO2019/096620
PCT Pub. Date: May 23, 2019

(65) Prior Publication Data
US 2021/0071642 A1 Mar. 11, 2021

(30) Foreign Application Priority Data
Nov. 14, 2017 (EP) .................... 17201571

(51) Int. Cl.
*F03D 13/25* (2016.01)
(52) U.S. Cl.
CPC ........ *F03D 13/25* (2016.05); *F05B 2230/232* (2013.01); *F05B 2240/95* (2013.01)
(58) Field of Classification Search
CPC . F05B 2240/95; F05B 2230/232; F03D 13/25
See application file for complete search history.

(56) References Cited

U.S. PATENT DOCUMENTS

| 4,007,598 | A | 2/1977 | Tax |
| 7,163,355 | B2 | 1/2007 | Ingle et al. |
| 9,120,542 | B2 | 9/2015 | Choisnet |
| 9,416,511 | B2 | 8/2016 | Kramer et al. |
| 2008/0257844 | A1 | 10/2008 | Gonzalez et al. |
| 2009/0282776 | A1 | 11/2009 | Berg |
| 2013/0266453 | A1 | 10/2013 | Moiret |
| 2014/0196654 | A1 | 7/2014 | Roddier et al. |
| 2015/0292175 | A1 | 10/2015 | Kramer et al. |

(Continued)

FOREIGN PATENT DOCUMENTS

| CN | 103930633 A | 7/2014 |
| CN | 207765283 U | 8/2018 |

(Continued)

OTHER PUBLICATIONS

International Search Report and Written Opinion from PCT Application No. PCT/EP2018/080256 dated Jan. 8, 2019.

(Continued)

*Primary Examiner* — Joseph Ortega
(74) *Attorney, Agent, or Firm* — Workman Nydegger

(57) ABSTRACT

A working platform for installation on an off-shore wind turbine comprises an impermeable top plate forming a top side of the working platform when installed, an impermeable bottom plate forming a bottom side of the working platform when installed and one or more impermeable side plates. The impermeable top, bottom and side plates are further arranged together to form an enclosed space impervious to water.

18 Claims, 2 Drawing Sheets

(56) References Cited

U.S. PATENT DOCUMENTS

2015/0316024 A1* 11/2015 Larsen ............... E02B 17/0034
 414/564
2019/0322338 A1* 10/2019 Stroo ...................... F03D 13/25

FOREIGN PATENT DOCUMENTS

| CN | 111120216 A | 5/2020 |
|----|-------------|--------|
| EP | 2418383 A2 | 2/2012 |
| EP | 2520533 A1 | 11/2012 |
| EP | 2586933 A1 | 5/2013 |
| EP | 3002456 B1 | 4/2017 |
| EP | 3104003 B1 | 1/2020 |
| ES | 2608504 A1 | 4/2017 |
| GB | 2483630 A | 3/2012 |
| KR | 20140085695 A | 7/2014 |
| WO | 2008006377 A1 | 1/2008 |
| WO | 2010059209 A2 | 5/2010 |
| WO | 2009080047 A3 | 9/2010 |
| WO | 2012001345 A1 | 1/2012 |
| WO | 2013137744 A1 | 9/2013 |
| WO | 2016175339 A1 | 11/2016 |

OTHER PUBLICATIONS

Extended European Search Report from EP Application No. 17201571.1 dated May 4, 2018.
Singh, "Corrosion Control for Offshore Structures: Cathodic Protection and High-Efficiency Coating," Gulf Professional Publishing, First Edition, at least before Dec. 31, 2014, 224 Pages.
"Guidelines for Design of Wind Turbines," DNV/Risø, Second Edition, at least before Dec. 31, 2002, 294 Pages.
Lafferty, "Examining the Merits of Jack Up Platforms as Foundations for the Offshore Wind Industry," Offshore Wind Foundations, May 20, 2011, 14 Pages.
"Standard Recommended Practice: Corrosion Control of Steel Fixed Offshore Structures Associated with Petroleum Production," Nace International: The Corrosion Society, Jun. 21, 2003, 44 Pages.
Lafferty, "Titan 200 Offshore Substructure for Wind Turbines: Concept of Operations (Preliminary)," Offshore Wind Power Systems of Texas LLC, May 6, 2014, 22 Pages.
Lafferty, "Titan 200 Offshore Substructure for Wind Turbines: Exploring the Project and Cost Benefits," Offshore Wind Power Systems of Texas LLC, May 6, 2014, 21 Pages.
Manwell et al., "Wind Turbine Design," Wind Energy Explained - Theory, Design and Application, at least before Dec. 31, 2002, 73 Pages.
"External Platform—General Arrangement," Sandbank Offshore Wind GmbH, Dec. 16, 2014, 1 Page.
"External Platform—Main Structure," Sandbank Offshore Wind GmbH, Dec. 16, 2014, 1 Page.
"External Platform—Detail 1," Sandbank Offshore Wind GmbH, Dec. 16, 2014, 1 Page.
External Platform—Detail 5, Sandbank Offshore Wind GmbH, Dec. 16, 2014, 1 Page.
"Sandbank Offshore Wind Farm Foundation Supply Agreement," May 28, 2014, 2 Pages.
Signed Witness Declaration of Markus Lapke, May 4, 2014, 1 Page.
Notice of Opposition corresponding to European Application No. EP17201571.1, dated May 11, 2021.
Chinese Search Report from corresponding CN Application No. 201880073679.3, dated Jul. 26, 2021.

* cited by examiner

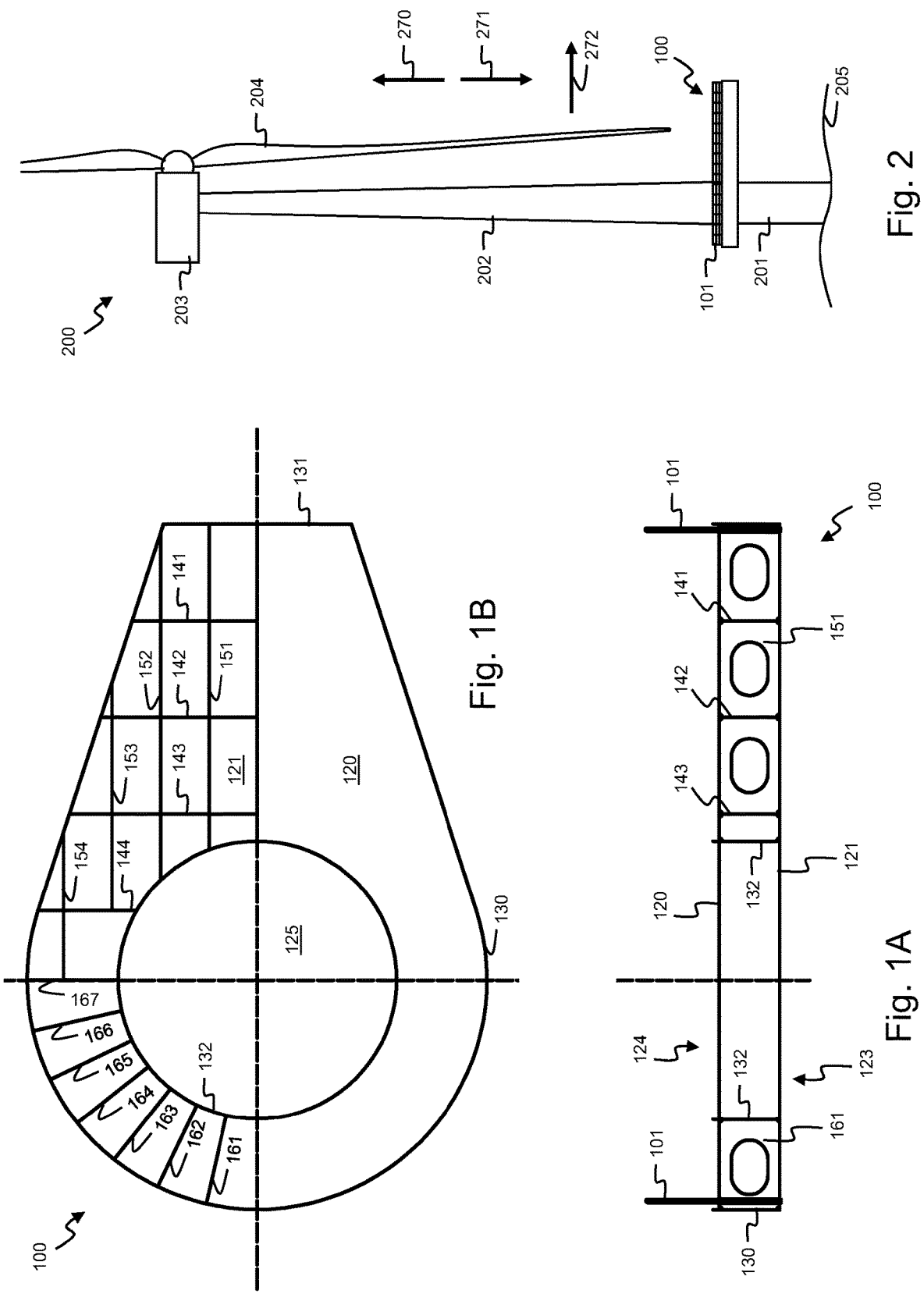

WIND TURBINE WORKING PLATFORM

FIELD OF THE INVENTION

The present invention generally relates to a working platform for installation on an off-shore wind turbine, to a method for manufacturing such a working platform, to an off-shore wind turbine comprising such a working platform and to a method for installing an off-shore wind turbine with such a working platform.

BACKGROUND OF THE INVENTION

Off-shore wind turbines have become one of the primary sources of renewable energy. The almost constant presence of wind on sea assures a high efficiency both in terms of produced electrical power and up-time. Moreover, the size of the wind turbines is only restricted by engineering constraints while on-shore wind turbines are much more restricted by other factors such as noise, aesthetics, shadow, air traffic etc.

A working platform, i.e. a horizontal platform extending away from the outside of the wind turbine, is an essential element. The working platform serves a multitude of functions, e.g. as a working area during and after construction, as an entrance to the inside of the wind turbine, as an entrance point for a boat landing ladder mounted underneath, as a support platform for a temporary or permanent crane, as a support for navigation aids such as lights and a foghorn, as a support for a motion compensated gateway that provides direct access from a vessel.

The different stringent requirements for the working platform make it a very costly element of the wind turbine. First of all, the platform must be able to withstand the aggressive sea environment. Second, there is a maximum deflection that the platform may exhibit. Third, the working platform is typically build on-shore, mounted onto a transition piece and then assembled onto the wind turbine off shore.

One implementation of a working platform, as for example disclosed in US2015/0292175, comprises a steel tubular framework with a plated working area fixed on top of the framework. The steel framework then gives the platform its necessary strength and stiffness. Further protection against corrosion may then be provided by one or more coating layers applied onto the complete platform.

Although the tubular framework based platform has proven to comply with the different stringent requirements, it still poses several drawbacks. First of all, the manufacturing process of the steel tubular framework is very labour intensive because all parts need to be welded together. In order to assure the required corrosion resistance, a full penetration weld is needed which may take several welding passes to achieve. Full penetration welding brings the further disadvantage that weld distortion may occur. Second, the coating itself is labour intensive due to all the curves and bends which are typical for tubular frameworks. Furthermore, all the irregularities due to the welding are potential weak points in the coating where corrosion may start. This disadvantage also affects the maintenance cost because working platforms must be inspected and repaired, e.g. recoated, where- or whenever needed. Because of the complex structure, the inspection process is long and thus expensive and because of the non-optimal coating, reparations are often necessary. Third, the steel thickness of the exposed parts in the tubular framework is typically over-dimensioned in terms of strength because it must withstand the extreme weather conditions. This further results in a high material and installation cost and further aggravates the aforementioned issues related to the welding.

SUMMARY OF THE INVENTION

It is an object to alleviate the above identified problems and disadvantages and, among others, provide a working platform that is less prone to distortion, that is less prone to construction errors or irregularities, that is easy to coat and maintain and has a lower bill of material.

This object is achieved, according to a first aspect, by a working platform for installation on an off-shore wind turbine, the working platform comprising: i) an impermeable top plate forming a top side of the working platform when installed; and ii) an impermeable bottom plate forming a bottom side of the working platform when installed; and iii) one or more impermeable side plates. The impermeable top, bottom and side plates are arranged together to form an enclosed space impervious to water.

In other words, the working platform comprises a box-like structure which is defined by the top, bottom and side plates and, thus, defines the enclosed space. Impermeable and impervious to water means that, when the working platform is installed, no water, i.e. sea or rain water, can enter the enclosed space under any weather conditions. This has the effect that everything within the enclosed space is not exposed to the weather elements and, therefore, must only be designed according to structural requirements, e.g., stiffness or deflection. It is therefore an advantage that a much simpler exposed outside structure is obtained that further results in less distortion, lighter materials, less irregularities that need to be coated and a lower bill of material.

Advantageously, the top, bottom and side plates are further arranged together to form a self-supporting structure. In other words, the top plate has a supporting function for vertical loads on top of the working platform and the side plates, which are in a substantially vertical position when installed, will provide further support for the top plate. In a similar way, the one or more impermeable side plates may further contribute to the vertical deflection resistance when installed.

In order to limit the vertical deflection, the height of the one or more impermeable side plates is such that the vertical deflection, when installed, is below a predetermined maximum vertical deflection. In other words, the bending of the platform under load is determined by the height of the side plates.

According to an embodiment, the one or more impermeable side plates comprise an inner and outer side plate arranged such that the enclosed space surrounds a through-hole by the inner side plate and extents outwardly from the through-hole up to the outer side plate; and wherein the through-hole is for fitting over a tubular cross-section of the off-shore wind turbine.

In other words, the enclosed space surrounds the pile of the wind turbine when installed such that the complete contour of the wind turbine is accessible by the work platform.

According to an embodiment, the working platform further comprises one or more inner beams within the enclosed space connected to the top and/or bottom plate such that the top and/or bottom plate are supported and such that, when in use, the one or more inner beams further contribute to the vertical deflection resistance.

In other words, the inner beams are a further structural element of the working platform. The height of the inner beams corresponds to the height of the side plates as they also extend from the top plate to the bottom plate. This results in an even stiffer working platform. As the inner beams are not exposed, their dimensioning may be determined by the integral stiffness requirements of the platform. This means that the thickness of the inner beams may be reduced because the overall deflection resistance of the platform will primarily be determined by the height of the beams.

Advantageously, the one or more inner beams are arranged according to a grid pattern. This means that at least two of the inner beams cross each other thereby providing a structural stiffness in two horizontal directions when installed.

More advantageously, in order to facilitate the crossing of the inner beams, the inner beams comprise slots and the inner beams crossing each other according to the grid pattern are fitted into each other by the slots. This has the further advantage that the inner beams will interlock with each other such that, despite the slots and even in absence of any permanent connection between crossing inner beams, the inner beams will provide a deflection resistance over their complete height.

Preferably, the impermeable top, bottom and side plates are made of metal and welded together to form the enclosed space impervious to rain. Similarly, also the inner beams may be made of metal and welded to the top and/or bottom plate. It is an advantage that only the top, bottom and side plates will have a thickness determined by the corrosion resistance and that the thickness of the inner beams will only be determined by structural requirements. Furthermore, only the connection between the top, bottom and side plates will require a full penetration weld, while all the other connections may be made by a much simpler weld, e.g., by a one pass staggered weld.

Alternatively, also other materials may be used for the plates and beams such as aluminium, fibre glass or fibre-reinforced plastic.

According to a second aspect, the invention relates to an off-shore wind turbine comprising the working platform according to any one of the preceding claims.

According to a third aspect, the invention also relates to a method for manufacturing the working platform according to the first aspect. The method comprises the following step:
    providing a first plate; and
    fixing the one or more inner beams onto the first plate; and
    fixing on or more plates onto the one or more inner beams thereby forming a second plate; and
    fixing the one or more side plates to the sides of the first and second plate; The first and second plate then respectively correspond to the bottom and top plate or, alternatively, the first and second plate respectively correspond to the top and bottom plate.

According to an embodiment, the method further comprises the following steps:
    fixing a first subset of the one or more inner beams on the first plate;
    fixing a second subset of the one or more inner beams on the first plate such that the first and second subset form a grid pattern.

According to a further embodiment, the method further comprises the following steps:
    welding the one or more inner beams onto the first plate; and
    welding the one or more plates onto the one or more inner beams.

Preferably the welding the one or more inner beams is performed by staggered welding.

According to a fourth aspect, the invention relates to a method for installing an off-shore wind turbine comprising the following steps:
    installing a tubular section of the off-shore wind turbine; and
    fitting the working platform according to the first aspect over the tubular section such that the tubular section sticks through the through-hole of the working platform; and
    fixing the working platform to the tubular section.

BRIEF DESCRIPTION OF THE DRAWINGS

FIG. 1A illustrates a side view of a cross-section of a working platform according to an embodiment of the invention; and FIG. 1B illustrates a top view of a working platform according to an embodiment of the invention of which the upper half of the figure is a cross-section; and FIG. 2 illustrates an off-shore wind turbine according to an embodiment of the invention.

DETAILED DESCRIPTION OF EMBODIMENT(S)

Figure 3A:
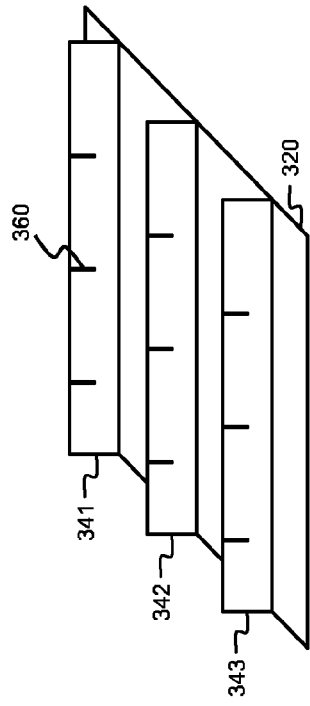
FIG. 3A, FIG. 3B, FIG. 3C and FIG. 3D illustrate different steps of a manufacturing process for making a working platform according to an embodiment of the invention.

FIG. 1A illustrates a side view of a cross-section 170 of a working platform 100 according to an embodiment of the invention. FIG. 1B illustrates a top view of the same working platform 100 wherein the upper half of the figure shows an inside view of the working platform when seen from the top and the lower half of the figure shows an outside view of the working platform when seen from the top 124. FIG. 2 illustrates the working platform 100 when installed onto a tubular structure 201 of an off-shore wind turbine 200. Relative terms for indicating a position of components of the working platform 100 such as top 124, bottom 123, side, upper and lower have to be understood in view of FIG. 2, i.e. higher refers to the vertical direction 270 away from the water level 205, lower refers to the opposite vertical direction 271 towards the water level 205 and horizontal references such as side refer to a direction 272 orthogonal to directions 270 and 271.

The working platform 100 is arranged for installation on the off-shore wind turbine 200. Working platform 100 comprises a top plate 120 which defines a horizontal working area when installed on the wind turbine 200. The top plate 120 is impermeable to water. When installed, water deposited on the working platform will not penetrated through the top plate, but will be evacuated to the sides of the top plate 120 by gravity. Advantageously, top plate 120 is inclined with respect to direction 271 such that all water is evacuated quickly form the working platform and such that no residue water remains on the platform, for example in small irregularities of top plate 120. The working platform 100 further comprises side walls 130, 131, 132 arranged substantially vertical at the border area of the top plate 120. Side walls 130, 131, 132 are also impermeable to water. On the bottom side 123 of the working platform 100, a bottom plate 121 is arranged to the other side of the side plates 130, 131, 132 such that the combination of the top plate 120, side plates 130, 131, 132 and bottom plate 121 define an enclosure. Also bottom plate 121 is impermeable to rain. The bottom, top and side plates are further permanently attached together such that the defined enclosure is impervious to rain and water when installed. Preferably, the enclosure is completely impervious to water such that water cannot penetrate the enclosure from any side when installed on wind turbine 200.

According to a preferred embodiment, plates 120, 121, 130, 131, 132 are made of metal, preferably steel, and welded together with a continuous weld thereby obtaining the impermeability at all transitions between the plates. More preferably, the weld is a full penetration weld. The steel plates of working platform 100 preferably heave a thickness of at least 8 mm, more preferably at least 15 mmm, in order to withstand impact and loads during use and to provide corrosion resistance for the lifetime of the wind turbine 200. Preferably, the outside of the enclosure is also coated for corrosion and impact resistance. Due to the closed enclosure, anti-corrosion measures on the inside may not be needed or to a lesser extent.

The height of side plates 130, 131, 132 is further selected to achieve a predetermined structural integrity, more particular, to obtain a predefined minimum stiffness in the vertical direction or, similarly, to obtain a predefined maximum vertical deflection of the working platform when installed and under static and dynamic vertical loads. For example, for a steel platform with an overhang of 8 m, the side walls may have a height of at least 70 cm. This results in a deflection of less than 1/200 and also allows accessing the enclosed space during construction.

Working platform 100 may further comprise inner beams 161-167, 141-144, 151-154. A beam is a structural element that primarily resists loads applied laterally to the beam's axis, i.e. loads in the vertical downward direction 271. On the bottom side 123, the beams are supported by the bottom platform 121, on the top side 124, the beams are supported by the top platform 120. The beams may therefore be defined as continuous beams because of the multiple support points. The beams have substantially the same height as the side walls 130-132. Therefore, when the beams are made of the same material as the side wall, e.g. steel, they will provide a similar structural support as the side walls especially in terms of maximum vertical deflection of the platform 100. The inner beams may be made thinner than the side walls because the beams will be less subject to corrosion due to the lack of water infiltration in the enclosed space. For the same example as above, when the side walls have a thickness of 15 mm, the beams may have a thickness of 12 mm. The beams may have a linear cross-section such as that of a plate, alternatively, the beams may have an H-, L-, C-, I- or L-shaped cross-section. Furthermore, the beams may have holes in the middle to ease access during construction and to decrease the weight of the working platform 100. Some of the beams 141-144, 151-154 may further be laid out according to a grid pattern, i.e. wherein a first set 141-144 of the beams cross another set 151-154 of the beams. The beams may further be laid out in parallel to each other such as for example beams 141-144 and beams 151-154, or the beams me be laid non-parallel to each other. This is the case for beams 161-167 which are laid out to obtain the highest stiffness.

According to a preferred embodiment and as illustrated in FIG. 1A and FIG. 1B, the working platform 100 surrounds a through-hole 125. A first substantially circular side plate 132 is arranged as a side wall around the through-hole and serves as a first side boundary of the enclosed space. The enclosed space then further extents outwardly, i.e. in a direction away from the side wall 132, by the top and bottom plates 120, 121 until the side plates 130, 131 which serve as a second and outermost side boundary of the enclosed space in a direction away from the through-hole. The through-hole 125 itself is selected such that it corresponds with a cross-section of the tubular section 201 of the wind turbine.

FIG. 2 illustrates the working platform 100 when installed as part of an off-shore wind turbine 200. The wind turbine 200 comprises tubular sections 201, 202 extending vertically from sea level 250. The lowest tubular section 201 may be provided as different elements, i.e. a first monopile which is drilled into the seabed and a second transition piece which is mounted on top of the monopile and extents above sea level. The working platform is then attached onto the transition piece. The monopile and transition piece may also be embodied by a single piece which is hammered directly into the seabed and extents above sea level 205. The wind turbine may further comprise a third tubular section or tower 202 which is mounted onto the transient piece or monopile. On top of the tower the turbine 203 itself with the rotor blades 204 is attached.

The working platform may further be supplied with other components such as a railing 101.

FIG. 3A to FIG. 3D illustrates steps for making a working platform for an off-shore wind turbine according to an embodiment of the invention. The steps may for example be performed for making the above working platform 100.

Figure 3B:
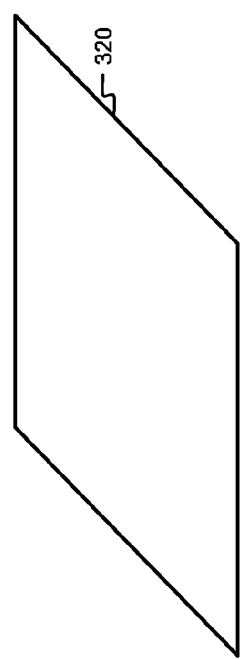

In a first step, as shown in FIG. 3A, a plate 320 of the working platform is provided. Preferably the plate 320 corresponds to the top plate 120 but, alternatively, also bottom plate 121 may be provided first. Then, as shown in FIG. 3B, a first set of inner beams 341, 342, 343 is provided, for example corresponding to inner beams 141-144. The first set of the inner beams comprise vertical slots 360 extending from the boundary of the beams up to the middle of the beams. The width of the slots is preferably at least the thickness of the beams themselves.

Figure 3C:
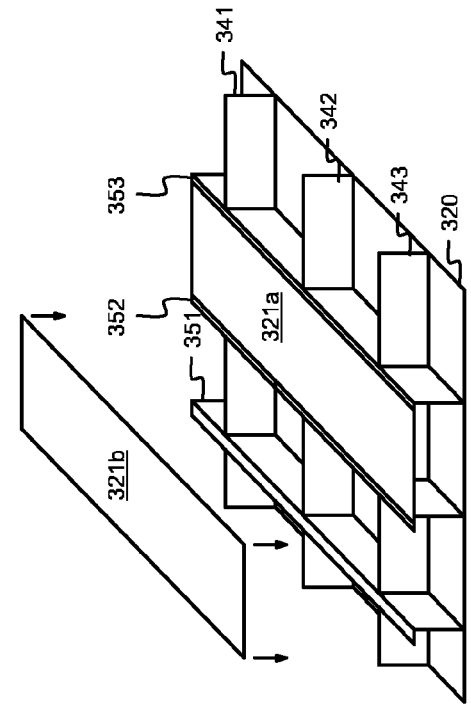

Then, in a next step as illustrated in FIG. 3C, a second set of the inner beams 351, 352, 353 are provided onto the top platform 320. The second set of beams have similar slots 360 as beams 341-341 and arranged such that a slot of the second set fits into a slot of the first set. As the slots extend at least up to the middle of the beams, the beams 351-353 slide into the first set of beams until they make contact with the plate 320. Beams 341-343 and 351-353 are further permanently fixed to the plate 320. When the beams are made of metal, they may for example be fixed by welding. As the beams all reside within the enclosure of the working platform 100, the welding may be performed in a single pass. Furthermore, the weld may be a non-continuous weld such as a staggered weld thereby saving time for the welding in comparison with continuous full penetration welding. Preferably, the beams 341-343 are further fixed to the beams 351-353 at the location of the slots 360, e.g. by welding.

Figure 3D:
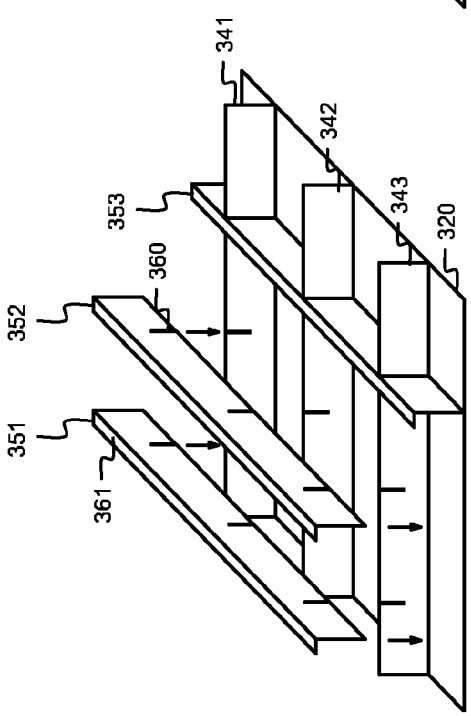

Then, in a next step as illustrated by FIG. 3D, plates 321a, 321b are provided on top of the beams 341-343 and 351-353. The plates are fixed to the underlying beams, for example by welding. Furthermore, the plates 321a and 321b are also fixed to each other thereby forming a single plate, preferably the bottom plate of the working platform. As the plates 321a and 321b are exposed when installed, the plates are preferably fixed to each other by a full penetration weld. In order to facilitate the fixing of the plates onto the beams 341-343 and 351-353, the beams may further comprise a flange 361, for example by providing the beam with an L-shaped cross-section.

When bottom plates 321a and 321b, the tope plate 320 and the inner beams are fixed to each other, the working platform may be further finished with side plates in order to obtain the fully enclosed space (not shown in figure) which is impervious to water. This way, a working platform 100 as shown in FIG. 1A and FIG. 1B may be obtained.

Alternative to the embodiments above, the plates of the platform 100 may also be made from other materials than steel, for example in aluminium, fibre glass or fibre reinforced plastic. Instead of welding, the permanent and impermeable fixation of the plates may then be achieved by an adhesive bond between the plates.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. It is to be understood that the terms so used are interchangeable under appropriate circumstances and embodiments of the invention are capable of operating according to the present invention in other sequences, or in orientations different from the one(s) described or illustrated above.

The invention claimed is:

1. A working platform for installation on an off-shore wind turbine, the working platform comprising:
   an impermeable top plate forming a top side of the working platform when installed; and
   an impermeable bottom plate forming a bottom side of the working platform when installed; and
   one or more impermeable side plates; and
   wherein the impermeable top, bottom and side plates are arranged together to form an enclosed space impervious to water.

2. The working platform according to claim 1 wherein the impermeable top, bottom and side plates are further arranged together to form a self-supporting structure.

3. The working platform according to claim 1 wherein the one or more impermeable side plates further contribute to the vertical deflection resistance when installed.

4. The working platform according to claim 3 wherein the height of the one or more impermeable side plates are determined such that the vertical deflection, when installed, is below a predetermined maximum vertical deflection.

5. The working platform according to claim 1 wherein the one or more impermeable side plates comprise an inner and outer side plate arranged such that the enclosed space surrounds a through-hole by the inner side plate and extents outwardly from the through-hole up to the outer side plate; and
   wherein the through-hole is for fitting over a tubular cross-section of the off-shore wind turbine.

6. The working platform according to claim 1 further comprising one or more inner beams within the enclosed space connected to the top and/or bottom plate such that the top and/or bottom plate are supported and such that, when in use, the one or more inner beams further contribute to the vertical deflection resistance.

7. The working platform according to claim 6 wherein the one or more inner beams are arranged according to a grid pattern.

8. A method for manufacturing the working platform according to claim 7 comprising the steps of:
   providing a first plate; and
   fixing the one or more inner beams on the first plate; and
   fixing on or more plates onto the one or more inner beams thereby forming a second plate; and
   fixing the one or more side plates to the sides of the first and second plate; and
   wherein the first and second plate respectively correspond to the bottom and top plate or
   wherein the first and second plate respectively correspond to the top and bottom plate.

9. The method according to claim 8 further comprising the steps of:
   fixing a first subset of the one or more inner beams on the first plate;
   fixing a second subset of the one or more inner beams on the first plate such that the first and second subset form a grid pattern.

10. The method according to claim 8 further comprising the steps of:
    welding the one or more inner beams onto the first plate; and
    welding the one or more plates onto the one or more inner beams.

11. The method according to claim 10 wherein the welding the one or more inner beams is performed by staggered welding.

12. The working platform according to claim 6 wherein the inner beams comprise slots; and
    wherein inner beams crossing each other according to the grid pattern are fitted into each other by the slots.

13. The working platform according to claim 6, wherein said one or more impermeable side plates each have a thickness, said thickness of the one or more impermeable side plates being greater than a thickness of each of the one or more inner beams.

14. The working platform according to claim 1 wherein the impermeable top, bottom and side plates are made of metal and welded together to form the enclosed space impervious to rain.

15. The working platform according to claim 14 wherein the one or more inner beams are made of metal and welded to the top and/or bottom plate.

16. An off-shore wind turbine comprising the working platform according to claim 1.

17. The working platform according to claim 1, wherein the impermeable top plate includes an inclined portion, said inclined portion forming an incline in a direction of the impermeable bottom plate.

18. The working platform according to claim 1, wherein the impermeable top, bottom and side plates are made of metal and welded together by a full penetration weld.

* * * * *